United States Patent Office 2,882,593
Patented Apr. 21, 1959

2,882,593

BRAZING FLUX

Menahem Merlub-Sobel, Jersey City, N.J., and Karl M. Weigert, Phillipsburg, Pa., assignors to Curtiss-Wright Corporation, a corporation of Delaware No Drawing. Application June 10, 1957
Serial No. 664,504

9 Claims. (Cl. 29—495)

This invention relates to the brazing of metals, and in particular to the brazing of titanium and related alloys.

Strong, ductile bonds have not been obtainable on titanium metal up to the present time, due to the formation of brittle intermetallic compounds at the interface, as well as because of the tendency of titanium and its alloys to oxidize and to react readily with the various gases of the atmosphere. In the case of torch brazing, there is the additional problem of reactivity of the metal with flame gases.

In a copending application of one of us (Karl M. Weigert, Serial No. 646,402, filed March 15, 1957, assigned to the same assignee as the present invention) a novel type of silver-base filler metal has been disclosed which acts as a strong and ductile bonding material on titanium, having a working temperature below 1500° F., and thereby avoiding the formation of brittle silver-titanium compounds which has hitherto prevented adequate bonding, and enabling the formation of a bond almost as strong as the original parent metal.

The prime object of this invention is to provide a suitable flux for use in the low temperature brazing of titanium and its alloys.

Other objects and advantages of the invention will become apparent from the specification.

The objects of the invention are achieved in a flux mixture consisting of $KHF_2$ and $KC_1$, and one or more other substances imparting specific desirable characteristics to the flux. $KHF_2$ and $KC_1$ account for the greatest portion of the mixture, and the remaining portion of the mixture consists of $BaCl_2$, or $BaCl_2$ and one or more other compounds specified hereinafter.

The flux of the invention is a low melting mixture having particular application to the low temperature brazing of titanium and its alloys with filler materials melting at temperatures of about 1500° F. or less. The flux is especially suitable for use with the brazing alloy disclosed in the already-mentioned application of Karl M. Weigert for "Brazing Alloy," Serial No. 646,402, filed March 15, 1957, and assigned to the same assignee as the present invention.

Flux mixtures consisting of only $KHF_2$ and $KC_1$ have been proposed heretofore for use in the brazing of titanium at low temperatures. While such mixtures have the advantage of melting at low temperatures, they exhibit a tendency to become watery and to run off the surfaces which they should protect. Also, flux mixtures consisting of only $KHF_2$ and $KC_1$ tend to decompose at temperatures as low as 1300° F. Other flux mixtures having application to the low temperature brazing of titanium and its alloys, and consisting of $KHF_2$, $KC_1$ and LiF are disclosed in Letters Patent 2,666,725 issued January 19, 1954 to E. S. Chamer. Such flux mixtures containing considerable quantities of LiF as specified for preferable compositions in said patent are however not entirely satisfactory in that the presence of substantial amounts of LiF results in the formation of a hard black crust when overheating occurs. The crust is not only hard to remove, but also obscures joint formation during brazing. Furthermore, when substantial amounts of LiF are present in a flux mixture, the red flame which results during brazing, due to the high concentration of Li, becomes objectionable.

The shortcomings of prior fluxes are overcome in the mixtures of this invention. As hereinbefore indicated, such mixtures are composed of $KHF_2$ and $KC_1$, which substances together constitute at least 80% of the flux mixture, and additional material for imparting certain desirable properties to the flux. The 80% figure and all percentage figures included hereinafter in the specification denote the proportions of ingredients in flux mixtures by weight, and no further indication of that fact is made.

One mixture constituted according to the invention consists of $KHF_2$, $KC_1$ and $BaCl_2$, which ingredients are present in the mixture in proportions within the following specified ranges:

| | Percent |
|---|---|
| $KHF_2$ | 30–70 |
| $KC_1$ | 20–80 |
| $BaCl_2$ | 1–20 |

The $BaCl_2$ in such flux mixture has the effect of increasing viscosity and serves to prevent the flux from becoming watery and running off the work during brazing operations. The $BaCl_2$ in the flux has the further effect of raising the melting temperature; however, the melting temperature may nevertheless be maintained sufficiently low, that is, below about 1200° F., if the $BaCl_2$ does not exceed 20% of the flux mixture. Indeed the $BaCl_2$ may serve as a control factor in fixing a particular melting point for the mixture. A preferable composition for the flux consist of 45% $KHF_2$, 45% $KC_1$ and 10% $BaCl_2$.

The flux mixture consisting of 30%–70% $KHF_2$, 20%–80% $KC_1$ and 1%–20% $BaCl_2$ may be modified by substituting $BaF_2$ for a portion of the $BaCl_2$ such that the $BaCl_2$ and $BaF_2$ together constitute from 1%–20% of the mixture and the proportions of the other ingredients remain unchanged. $BaCl_2$ and $BaF_2$ both function in the resulting flux to increase its viscosity. Any amount of $BaF_2$ up to about 5% of the mixture may be used. The $BaF_2$ should preferably be limited to not more than about 5% of the total flux mixture since larger amounts of this substance result in raising the melting temperature of the flux too high. A preferred composition for the flux consists of 35% $KHF_2$, 50% $KC_1$, 10% $BaCl_2$ and 5% $BaF_2$.

In another modification of the flux mixture consisting of 30%–70% $KHF_2$, 20%–80% $KC_1$ and 1%–20% $BaCl_2$, LiF is substituted for a portion of the $BaCl_2$ such that the $BaCl_2$ and LiF together constitute from 1%–20% of the total flux mixture and the proportions of the $KHF_2$ and $KC_1$ remained unchanged. The presence of LiF in the flux mixture is desirable since it acts as a wetting agent. However, the amount of LiF should not exceed about 5% of the flux. As hereinbefore noted, substantial quantities of LiF result in the formation of a hard-to-remove black crust during brazing and cause an objectionable red glare in the flame due to the high concentration of Li. A preferred composition consists of 35% $KHF_2$, 50% $KC_1$, 10% $BaCl_2$ and 5% LiF.

In still another modification of the flux mixture consisting of $KHF_2$, $KC_1$ and $BaCl_2$ both $BaF_2$ and LiF may be substituted for a portion of the $BaCl_2$ such that the resulting mixture consists of 30%–70% $KHF_2$, 20%–80% $KC_1$ and 1%–20% $BaCl_2$, $BaF_2$ and LiF. The $BaF_2$ and LiF should not exceed about 10% and 5% respectively of the total flux mixture for reasons noted herein in connection with the discussion of the one flux mixture including $BaF_2$ and the other flux mixture including LiF.

A preferable mixture consists of 40% $KHF_2$, 40% $KC_1$, 10% $BaCl_2$ and 5% LiF.

As has been noted, the flux mixtures of the invention are particularly suitable for use in the low temperature brazing of titanium and its alloys, that is, for brazing temperatures about 1500° F. and lower. However, this is not to say that the flux may not be used for higher brazing temperatures. The flux will function satisfactorily at temperatures considerably in excess of 1500° F. The flux while having particular application to the brazing of titanium and its alloys, is not limited in application to the brazing of these metals only. Highly satisfactory results may, for example, be obtained in brazing steel to titanium, or steel to titanium alloys with the flux mixtures of the invention and the brazing alloy disclosed in the copending application of Karl M. Weigert for "Brazing Alloy," Serial No. 646,402, filed March 15, 1957, and assigned to the same assignee as the present invention.

The flux mixture disclosed herein may be made into a paste by the addition of water and, optionally, some free hydrofluoric acid, and applied in this manner to surfaces which are to be brazed. The flux mixtures may also be applied as a powder to such surfaces, or it may be coated on a rod of brazing filler material. The flux mixtures of the invention are preferably used with low melting filler material such as silver, silver base alloys and the alloy disclosed in the aforesaid application of Karl M. Weigert, Serial No. 646,402, and brazing operations are preferably carried out at temperatures of between 1300° F. and 1500° F. Brazing operations may be carried out in the usual manner by melting filler material, as with a torch in the presence of the flux and permitting the melted filler material to flow onto surfaces which are to be joined. Other known heating techniques, such as induction brazing or furnace brazing, may equally well be used.

We claim as our invention:

1. A flux mixture consisting of 30% to 70% by weight of $KHF_2$ and 20% to 80% by weight of $KC_1$ which substances together constitute 80% to 99% of the weight of the mixture; and 1% to 20% by weight of $BaCl_2$, 0% to 5% by weight of $BaF_2$, and 0% to 5% by weight of LiF.

2. A flux mixture consisting of 30% to 70% by weight of $KHF_2$ and 20% to 80% by weight of $KC_1$ which together constitute 80% to 99% of the weight of the mixture; and a quantity of each of the substances $BaCl_2$ and $BaF_2$ which together constitute 1% to 20% of the weight of the mixture, the $BaF_2$ being present in quantities constituting up to 5% of the weight of the mixture.

3. A flux mixture consisting of 30% to 70% by weight of $KHF_2$ and 20% to 80% by weight of $KC_1$ which together constitute 80% to 99% of the weight of the mixture; and a quantity of each of the substances $BaCl_2$ and LiF which together constitute 1% to 20% of the weight of the mixture, the LiF being present in quantities constituting up to 5% of the weight of the mixture.

4. A flux mixture consisting of 30% to 70% by weight of $KHF_2$ and 20% to 80% by weight of $KC_1$ which together constitute 80% to 99% of the weight of the mixture; and a quantity of each of the substances $BaCl_2$, $BaF_2$ and LiF which together constitute 1% to 20% of the weight of the mixture, the $BaF_2$ and LiF being present in quantities constituting up to 5% each of the weight of the mixture.

5. A flux mixture consisting of 50% by weight of $KHF_2$, 45% by weight of $KC_1$ and 5% by weight of $BaCl_2$.

6. A flux mixture consisting of 35% by weight of $KHF_2$, 50% by weight of $KC_1$, 10% by weight of $BaCl_2$ and 5% by weight of $BaF_2$.

7. A flux mixture consisting of 35% by weight of $KHF_2$, 50% by weight of $KC_1$, 10% by weight of $BaCl_2$ and 5% by weight of LiF.

8. A flux mixture consisting of 40% by weight of $KHF_2$, 40% by weight of $KC_1$, 10% by weight of $BaCl_2$, 5% by weight of $BaF_2$ and 5% by weight of LiF.

9. A method of brazing two metals of which at least one contains titanium comprising the steps of providing a silver-base filler material having a melting temperature between 1300° F. and 1500° F. and a flux constituted according to claim 1; and melting said filler material at temperatures up to 1500° F. in the presence of said flux onto metal surfaces to be joined.

References Cited in the file of this patent

UNITED STATES PATENTS

| | | |
|---|---|---|
| 2,604,394 | Emley | July 22, 1952 |
| 2,666,725 | Chamer | Jan. 19, 1954 |
| 2,731,362 | Brondyke | Jan. 17, 1956 |
| 2,768,893 | Bredzs | Oct. 30, 1956 |

UNITED STATES PATENT OFFICE

CERTIFICATE OF CORRECTION

Patent No. 2,882,593                                                     April 21, 1959

Menahem Merlub-Sobel et al.

It is hereby certified that error appears in the printed specification of the above numbered patent requiring correction and that the said Letters Patent should read as corrected below.

Column 1, lines 41, 43, 56, 62, and 65, column 2, lines 8, 17, 23, 35, 37, 48, 51, 55, 63, 65, and 68, column 3, lines 2, 40, and 46, and column 4, lines 6, 13, 21, 24, 27, and 30, for "$KC_1$", each occurrence, read -- KCl --.

Signed and sealed this 22nd day of September 1959.

(SEAL)

Attest:

KARL H. AXLINE                                              ROBERT C. WATSON

Attesting Officer                                          Commissioner of Patents